(12) United States Patent
Blocher et al.

(10) Patent No.: US 10,001,787 B2
(45) Date of Patent: Jun. 19, 2018

(54) CONTROLLER FOR VACUUM SEWAGE SYSTEM

(71) Applicant: Aqseptence Group, Inc., New Brighton, MN (US)

(72) Inventors: Troy E. Blocher, Warsaw, IN (US); John M. Grooms, Rochester, IN (US)

(73) Assignee: Aqseptence Group, Inc., New Brighton, MN (US)

( * ) Notice: Subject to any disclaimer, the term of this patent is extended or adjusted under 35 U.S.C. 154(b) by 122 days.

(21) Appl. No.: 14/642,872

(22) Filed: Mar. 10, 2015

(65) Prior Publication Data

US 2015/0346734 A1 Dec. 3, 2015

Related U.S. Application Data

(60) Provisional application No. 62/006,576, filed on Jun. 2, 2014.

(51) Int. Cl.
*G05D 7/06* (2006.01)
*E03F 5/22* (2006.01)
(Continued)

(52) U.S. Cl.
CPC .......... *G05D 7/0641* (2013.01); *E03F 1/006* (2013.01); *E03F 5/22* (2013.01); *F16K 5/12* (2013.01);
(Continued)

(58) Field of Classification Search
CPC .................. E03F 1/006; Y10S 137/907; Y10T 137/2365; Y10T 137/2409; Y10T 137/2822; Y10T 137/3109; Y10T 137/402; Y10T 137/7287; Y10T 137/731; Y10T 137/7313; Y10T 137/7316; Y10T 137/7326; Y10T 137/7762; Y10T 137/7769; Y10T 137/777; Y10T 137/784;
(Continued)

(56) References Cited

U.S. PATENT DOCUMENTS 1,964,300 A * 6/1934 Perry ........................ F23Q 9/00
138/42
3,115,148 A 12/1963 Liljendahl
(Continued)

FOREIGN PATENT DOCUMENTS

| CA | 1094253 A | 1/1981 |
|---|---|---|
| CA | 1094255 A | 1/1981 |

(Continued)

OTHER PUBLICATIONS

European Patent Office, Invitation to Pay Additional Fees and, Where Applicable, Protest Fee in corresponding international application, dated May 27, 2015, 4 pages.
(Continued)

*Primary Examiner* — Mary McManmon
*Assistant Examiner* — Hailey K Do
(74) *Attorney, Agent, or Firm* — Barnes & Thornburg LLP

(57) ABSTRACT

A controller for a vacuum sewage system includes a housing having multiple chambers. Certain chambers are maintained under atmospheric pressure or vacuum prior to activation of the controller. Ports, valves, orifices and air flow paths located in the housing control the rate of air flow between groups of the chambers during activation of the controller.

45 Claims, 14 Drawing Sheets

(51) Int. Cl.
*F16K 5/12* (2006.01)
*E03F 1/00* (2006.01)

(52) U.S. Cl.
CPC ...... *Y10S 137/907* (2013.01); *Y10T 137/3109* (2015.04); *Y10T 137/402* (2015.04); *Y10T 137/789* (2015.04); *Y10T 137/7848* (2015.04); *Y10T 137/86083* (2015.04); *Y10T 137/86187* (2015.04)

(58) Field of Classification Search
CPC ......... Y10T 137/7843; Y10T 137/7848; Y10T 137/7887; Y10T 137/7891; Y10T 137/8663; Y10T 137/8667; Y10T 137/86678; G05D 9/00; G05D 9/02; G05D 9/04; G05D 16/0677; G05D 16/163; F16K 5/12; F16K 5/0471; F16K 5/0414
USPC .................................................. 251/304, 309
See application file for complete search history.

(56) References Cited

U.S. PATENT DOCUMENTS

| | | | |
|---|---|---|---|
| 3,454,182 A * | 7/1969 | Morton ................... | B61F 15/22 137/513.5 |
| 3,662,779 A | 5/1972 | Weber et al. | |
| 3,663,970 A | 5/1972 | Drouhard, Jr. et al. | |
| 3,686,693 A | 8/1972 | Liljendahl | |
| 3,698,019 A | 10/1972 | Culp | |
| 3,730,884 A | 5/1973 | Burns et al. | |
| 3,746,032 A | 7/1973 | Wallgren | |
| 3,762,384 A | 10/1973 | Day et al. | |
| 3,774,637 A | 11/1973 | Weber et al. | |
| 3,777,778 A | 12/1973 | Janu | |
| 3,791,397 A | 2/1974 | Janu | |
| 3,807,431 A | 4/1974 | Svanteson | |
| RE28,008 E | 5/1974 | Liljendahl | |
| 3,812,882 A * | 5/1974 | Taylor ................... | F16K 3/085 137/556.6 |
| 3,814,542 A | 6/1974 | Iglesias et al. | |
| 3,824,033 A | 7/1974 | Chacour | |
| 4,171,853 A | 10/1979 | Cleaver et al. | |
| 4,179,371 A | 12/1979 | Foreman et al. | |
| 4,184,506 A | 1/1980 | Varis et al. | |
| 4,199,828 A | 4/1980 | Hellers | |
| 4,220,073 A | 9/1980 | Ohashi et al. | |
| 4,223,701 A | 9/1980 | Bible et al. | |
| 4,245,664 A | 1/1981 | Johnson | |
| 4,261,672 A | 4/1981 | Marbach | |
| 4,275,470 A | 6/1981 | Badger et al. | |
| 4,357,719 A | 11/1982 | Badger et al. | |
| 4,373,838 A | 2/1983 | Foreman et al. | |
| 4,477,051 A | 10/1984 | Ben-Yehuda | |
| 4,612,783 A * | 9/1986 | Mertz ..................... | F25B 41/06 251/207 |
| 4,630,644 A | 12/1986 | Hafner et al. | |
| 4,674,464 A | 6/1987 | Akagi | |
| 4,691,731 A | 9/1987 | Grooms et al. | |
| 4,706,706 A | 11/1987 | Page et al. | |
| 4,713,847 A | 12/1987 | Oldfelt et al. | |
| 4,732,192 A | 3/1988 | Shen | |
| 4,782,811 A | 11/1988 | Hewette et al. | |
| 4,819,279 A | 4/1989 | Sigler et al. | |
| 4,917,143 A | 4/1990 | Grooms | |
| 5,044,836 A | 9/1991 | Grooms | |
| 5,056,548 A | 10/1991 | Mills | |
| 5,064,314 A | 11/1991 | Grooms et al. | |
| 5,069,243 A | 12/1991 | Foreman | |
| 5,078,174 A | 1/1992 | Grooms et al. | |
| 5,082,238 A | 1/1992 | Grooms et al. | |
| 5,083,885 A | 1/1992 | Ushitora et al. | |
| 5,114,280 A | 5/1992 | Ushitora et al. | |
| 5,232,010 A | 8/1993 | Rozenblatt et al. | |
| 5,259,427 A | 11/1993 | Grooms et al. | |
| 5,282,281 A | 2/1994 | Clear et al. | |
| 5,326,069 A | 7/1994 | Clear et al. | |
| 5,515,554 A | 5/1996 | Clear et al. | |
| 5,570,715 A | 11/1996 | Featheringill et al. | |
| 5,588,458 A | 12/1996 | Ushitora et al. | |
| 5,615,701 A | 4/1997 | Yamabe et al. | |
| 5,634,494 A | 6/1997 | Martens | |
| 5,657,784 A | 8/1997 | Martens | |
| 5,673,723 A | 10/1997 | Roediger | |
| 5,871,027 A | 2/1999 | Shimizu et al. | |
| 5,918,853 A | 7/1999 | Yamabe et al. | |
| 6,119,283 A | 9/2000 | Galler | |
| 6,360,768 B1 | 3/2002 | Galler | |
| 6,397,874 B1 | 6/2002 | Featheringill et al. | |
| 6,467,494 B1 | 10/2002 | Kolb et al. | |
| 6,575,425 B1 | 6/2003 | Betz | |
| 6,681,796 B2 * | 1/2004 | King, Jr. ................ | F16L 41/065 137/107 |
| 6,857,281 B2 * | 2/2005 | Wightman ............ | F16K 3/0209 236/92 B |
| 6,889,707 B2 * | 5/2005 | Nicolino ................ | F16K 15/148 137/513.3 |
| 7,114,516 B2 | 10/2006 | Ito | |
| 7,380,568 B2 | 6/2008 | Tiwet | |
| 8,028,715 B2 | 10/2011 | Shimizu et al. | |
| 2006/0237075 A1 | 10/2006 | Betz | |
| 2010/0065131 A1 | 3/2010 | Grooms | |
| 2011/0214758 A1 | 9/2011 | Spitzer | |
| 2012/0247595 A1 * | 10/2012 | Raftis ................... | F16K 15/147 137/883 |

FOREIGN PATENT DOCUMENTS

| | | |
|---|---|---|
| DE | 29616003 U1 | 2/1997 |
| EP | 0328457 A1 | 8/1989 |
| EP | 0415359 A2 | 3/1991 |
| EP | 0445462 A1 | 9/1991 |
| EP | 0628900 A2 | 12/1994 |
| EP | 1752589 A1 | 2/2007 |
| EP | 2363542 A2 | 9/2011 |
| GB | 2339215 A | 1/2000 |
| JP | 2812077 | 8/1953 |
| JP | 03247827 | 11/1991 |
| JP | 09144120 | 6/1997 |
| JP | 10168999 | 6/1998 |
| WO | 0206594 A1 | 1/2002 |

OTHER PUBLICATIONS

European Patent Office, Annex to Form PCT/ISA/206 Communication Relating to the Results of the Partial International Search, dated May 27, 2015, 3 pages.

European Patent Office, International Search Report, dated Aug. 17, 2015, 7 pages.

European Patent Office, Written Opinion, dated Aug. 17, 2015, 10 pages.

European Patent Office, International Preliminary Report on Patentability in a corresponding patent application, dated Dec. 6, 2016, 11 pages.

* cited by examiner

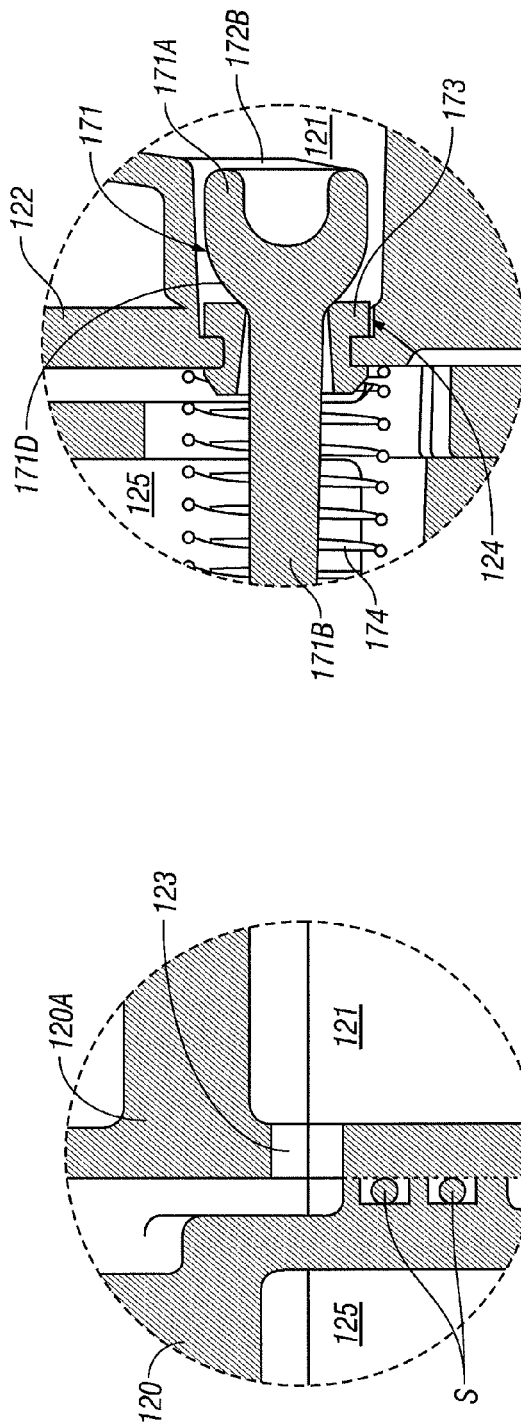
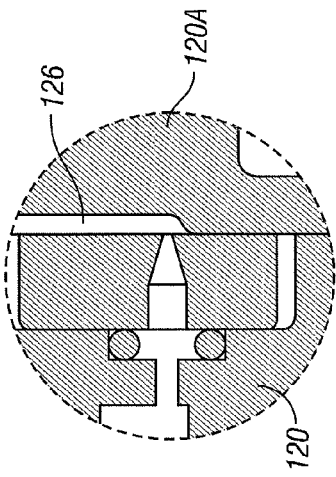
FIG. 3A
FIG. 3B
FIG. 3C

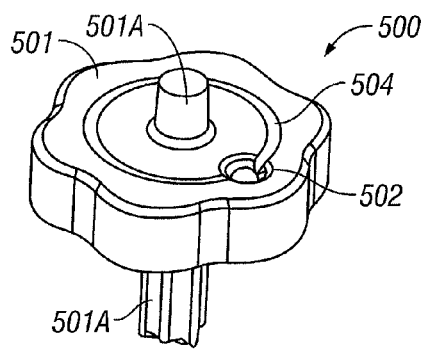
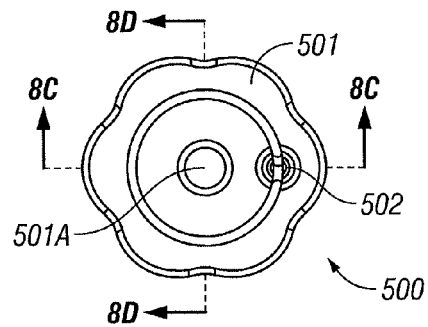
FIG. 8A   FIG. 8B
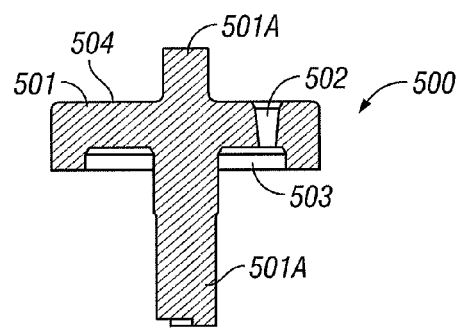
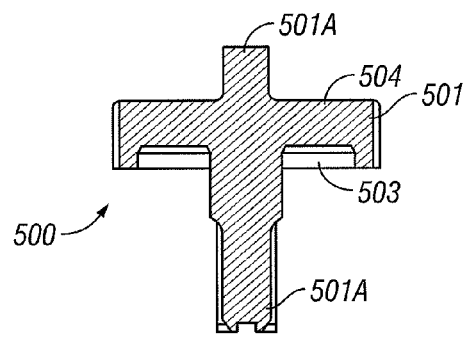
FIG. 8C   FIG. 8D

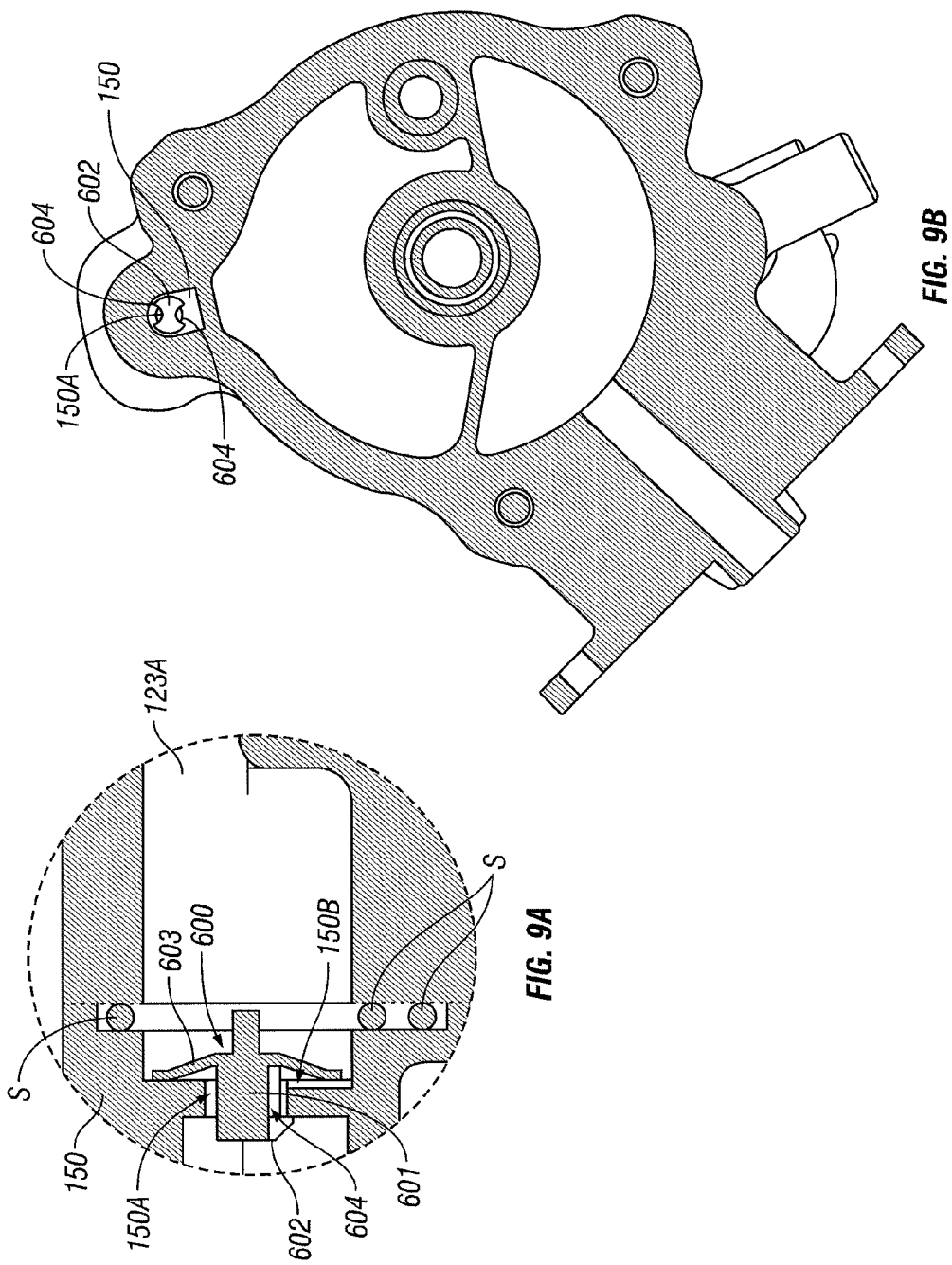

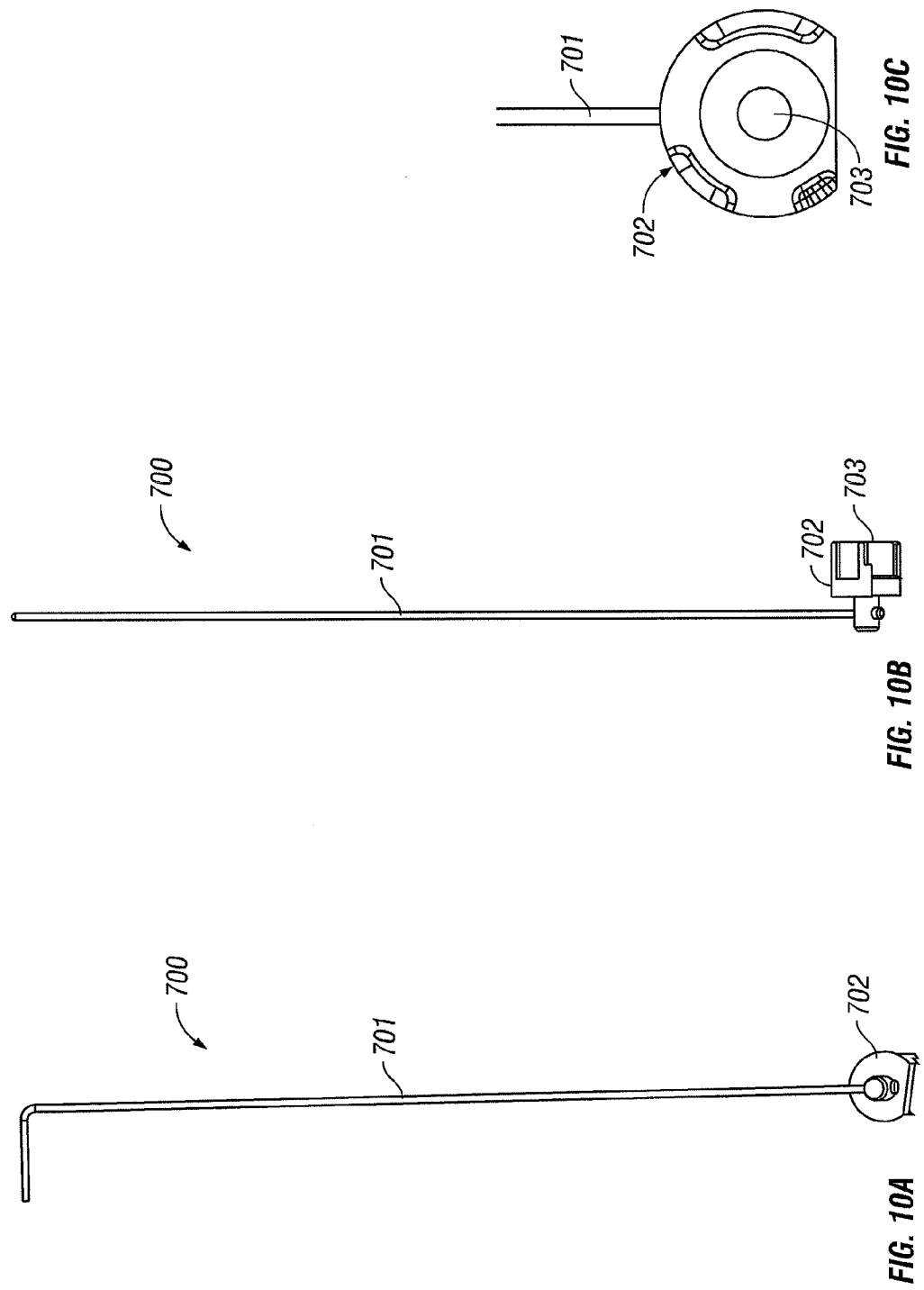

CONTROLLER FOR VACUUM SEWAGE SYSTEM

The present invention relates generally to sewage systems which utilize differential pressures to produce sewage transport through the system and, in particular, to a controller for a vacuum sewage system.

SUMMARY OF THE INVENTION

One embodiment of the present invention includes a controller for a vacuum sewage system. The system includes a holding tank at substantially atmospheric pressure, a valve pit, a sensor pipe having a first end extending into the holding tank and a second end extending into the valve pit, a valve located in the valve pit and a discharge conduit for conveying sewage from the holding tank to a location exterior to the holding tank. The discharge conduit has a first section and a second section. The first section has a first end located in the holding tank and a second end in fluid communication with the valve. The second section has an end in fluid communication with the valve and a vacuum source for maintaining the second section of the discharge conduit under vacuum. The controller includes a housing having at least six chambers, a pressure sensor conduit, at least seven ports, at least four valve members, at least two flexible diaphragms and at least three air flow paths. The pressure sensor conduit has a first end in pressure communication with the sensor pipe and a second end in pressure communication with a first chamber. A first port is in communication with a second chamber and with a source of atmospheric pressure. A first flexible diaphragm is located between the first and second chambers. A second port extends between the second chamber and a third chamber. A first valve member is located at least partially within the second chamber for selectively opening and closing the second port so as to selectively permit or prevent air flow between the second and third chambers through the second port. A third port is in communication with the third chamber. A second flexible diaphragm is located between the third chamber and a fourth chamber. A first air flow path extends between the third and fourth chambers. A fourth port is in communication with a fifth chamber and with the second section of the discharge conduit. A second air flow path extends between the third, fourth and fifth chambers. A second valve member is located at least partially in the second air flow path to selectively permit or prevent air flow between the second, third and fourth chambers. A fifth port is in communication with the fifth chamber and a sixth chamber. A sixth port is in communication with the sixth chamber and with a source of substantially atmospheric pressure. A third valve member is located at least partially in the sixth chamber for selectively opening and closing the fifth port so as to selectively permit or prevent air flow between the fifth and sixth chambers through the fifth port and for selectively opening and closing the sixth port so as to selectively permit or prevent air flow between the sixth chamber and the source of substantially atmospheric pressure through the sixth port. A seventh port is in communication with the sixth chamber. A third air flow path extends between the second chamber and the seventh port. A fourth valve member is located at least partially in in the third air flow path.

In one embodiment of the invention, the fourth valve member includes an eighth port through which air at atmospheric pressure can flow when the fourth valve member is closed. The fourth valve member may be a duckbill valve.

In another embodiment, the fourth member valve is a check valve. The controller may include an opening through a portion of the housing in the third air flow path and the check valve may include a body extending through the opening, a head attached to the body on one side of the opening and a moveable flange connected to the body on the side of the opening opposite the head. A passageway may extend through the head. Another passageway may be formed in the housing adjacent the moveable flange and extend from the opening in the housing beyond the outer perimeter of the moveable flange.

In one embodiment of the invention, a rod having a first end extends from the second flexible diaphragm and has a second end connected to the third valve member. The rod may extend through the fifth port. A portion of the rod may be tapered. Movement of the second flexible diaphragm imparts movement to the rod and the third valve member to selectively open and close the fifth and sixth ports. In one embodiment, an increase in pressure in the third chamber causes the second end of the rod to move toward the sixth port. In another embodiment, a decrease in pressure in the fourth chamber causes the second end of the rod to move toward the sixth port. In another embodiment, a decrease in pressure in the third chamber causes the second end of the rod to move toward the fifth port. In yet another embodiment of the invention, an increase in pressure in the fourth chamber causes the second end of the rod to move toward the fifth port.

In another embodiment of the present invention, a biasing means biases the third valve member toward the fifth port.

In another embodiment, an adjustable orifice is located at least partially within the first air flow path between the third and fourth chambers. The adjustable orifice regulates the rate of air flow from the third chamber to the fourth chamber. The adjustable orifice may include a member having at least two orifices of different sizes. In one embodiment, the member is rotatable. The member may be located on a shaft. In another embodiment, the controller includes a lever located at least partially outside the housing for rotating the member. In one embodiment, a detent member retains the rotatable member in a selected position. The detent member may include a compressible member.

In another embodiment of the invention, the adjustable orifice includes a member having a first side, a second side and a first groove. The first groove may be located in the first side of the member and the member may further include an orifice extending from the first side to the second side. The orifice creates an air flow path from the first groove through the member to the second side of the member. In one embodiment, the second side of the member includes a second groove. In another embodiment of the invention, the orifice creates an air flow path from the first groove to the second groove. In another embodiment, the second groove varies in width. In another embodiment, the second groove varies in depth. In another embodiment, the adjustable orifice further includes a sealing member having an opening therein adjacent the second groove. Movement of the member selectively causes a larger or smaller volume segment of the second groove to be exposed within the opening in the sealing member to increase or decrease the rate of air flow through the adjustable orifice.

In one embodiment of the present invention, the controller further includes a magnet connected to the first diaphragm. The magnet has a first polarity. The controller may be activated by applying to the magnet a magnetic force having a second polarity opposite the first polarity.

In another embodiment of the invention, movement of the first flexible diaphragm toward the second chamber activates the first valve member to open the second port. In one embodiment, an increase in pressure in the first chamber causes the first flexible diaphragm to move toward the second chamber. In another embodiment, a decrease in pressure in the second chamber causes the first flexible diaphragm to move toward the second chamber.

In another embodiment of the invention, the controller further includes a valve seat located adjacent the second port. The first valve member disengages from the valve seat to open the second port and engages the valve seat to close the second port. The valve seat and first valve member are configured such that the first valve member is centered with respect to the valve seat when the first valve member engages the valve seat.

In another embodiment of the invention, the housing includes and upper region, a lower region and an eighth port located in the sixth chamber. The third air flow path and the seventh port are positioned in the upper region such that liquid collecting in the upper region of the housing will flow from the third air flow path, through the seventh port, to the lower region of the housing and exit the controller through the eighth port. A controller for a vacuum sewage system according to another embodiment of the present invention includes a housing, a first chamber located in the housing, a second chamber located in the housing, an air flow path through the housing between the first and second chambers and an adjustable orifice located at least partially within the air flow path for controlling the rate of air flow between the first and second chambers.

A controller for a vacuum sewage system according to another embodiment of the present invention includes a housing, a first chamber located in the housing, a second chamber located in the housing, a flexible diaphragm located in the housing, a first port in communication with the first and second chambers, a second port in communication with the second chamber and with a source of substantially atmospheric pressure, a valve member located at least partially in the second chamber and a rod extending through the first port, the rod having a first end connected to the flexible diaphragm and a second end connected to the valve member. The valve member selectively opens and closes the first port so as to selectively permit or prevent air flow between the first and second chambers through the first port and selectively opens and closes the second port so as to selectively permit or prevent air flow between the second chamber and the source of substantially atmospheric pressure through the second port.

A controller for a vacuum sewage system according to another embodiment of the present invention includes a housing, a first chamber located in the housing, a second chamber located in the housing, an air flow path through the housing between the first and second chambers and a valve located at least partially in in the air flow path. The valve has a valve member having an open state and a closed state. The valve member further includes an opening permitting air at atmospheric pressure to flow from the first chamber to the second chamber when the valve member is in the closed state.

A controller for a vacuum sewage system according to another embodiment of the present invention includes a housing, a first chamber located in the housing, a second chamber located in the housing, a port extending between the first and second chambers, a valve seat located adjacent the port and a valve member for selectively opening and closing the port so as to selectively permit or prevent air flow between the first and second chambers. The valve member is configured to disengage from the valve seat to open the port and to engage the valve seat to close the port. The valve seat and valve member are configured such that the valve member is centered with respect to the valve seat when the valve member engages the valve seat.

A controller for a vacuum sewage system according to another embodiment of the present invention includes a housing having an upper region and a lower region, a chamber located in the housing, a first port extending between the upper region and the chamber and a second port located in the chamber. The first port is positioned above the second port such that liquid collecting in the upper region of the housing will flow through the first port to the lower region of the housing and exit the controller through the second port.

These and other features of the present invention will be apparent from the following description and accompanying drawings.

BRIEF DESCRIPTION OF THE DRAWINGS

FIG. 3A is an enlarged view of detail 3A in FIG. 3.

FIG. 3B is an enlarged view of detail 3B in FIG. 3.

FIG. 3C is an enlarged view of detail 3C in FIG. 3.

FIG. 8A is a perspective view of another embodiment of an adjustable orifice that is a component of a controller according to one embodiment of the present invention.

FIG. 8B is a top plan view of the adjustable orifice shown in FIG. 8A.

FIG. 8C is a cross-sectional view taken along line 8C-8C in FIG. 8B.

FIG. 8D is a cross-sectional view taken along line 8D-8D in FIG. 8B.

FIG. 9A is an alternative embodiment of the components shown in FIG. 3E.

FIG. 9B is a cross sectional view taken along line 9-9 in FIG. 3.

FIG. 10A is a front plan view of an activation tool for a controller according to one embodiment of the present invention.

FIG. 10B is a side plan view of the activation tool in FIG. 10A.

FIG. 10C is a detail view of a portion of the activation tool in FIG. 10A.

DETAILED DESCRIPTION OF THE EMBODIMENTS OF THE INVENTION

Figure 1:
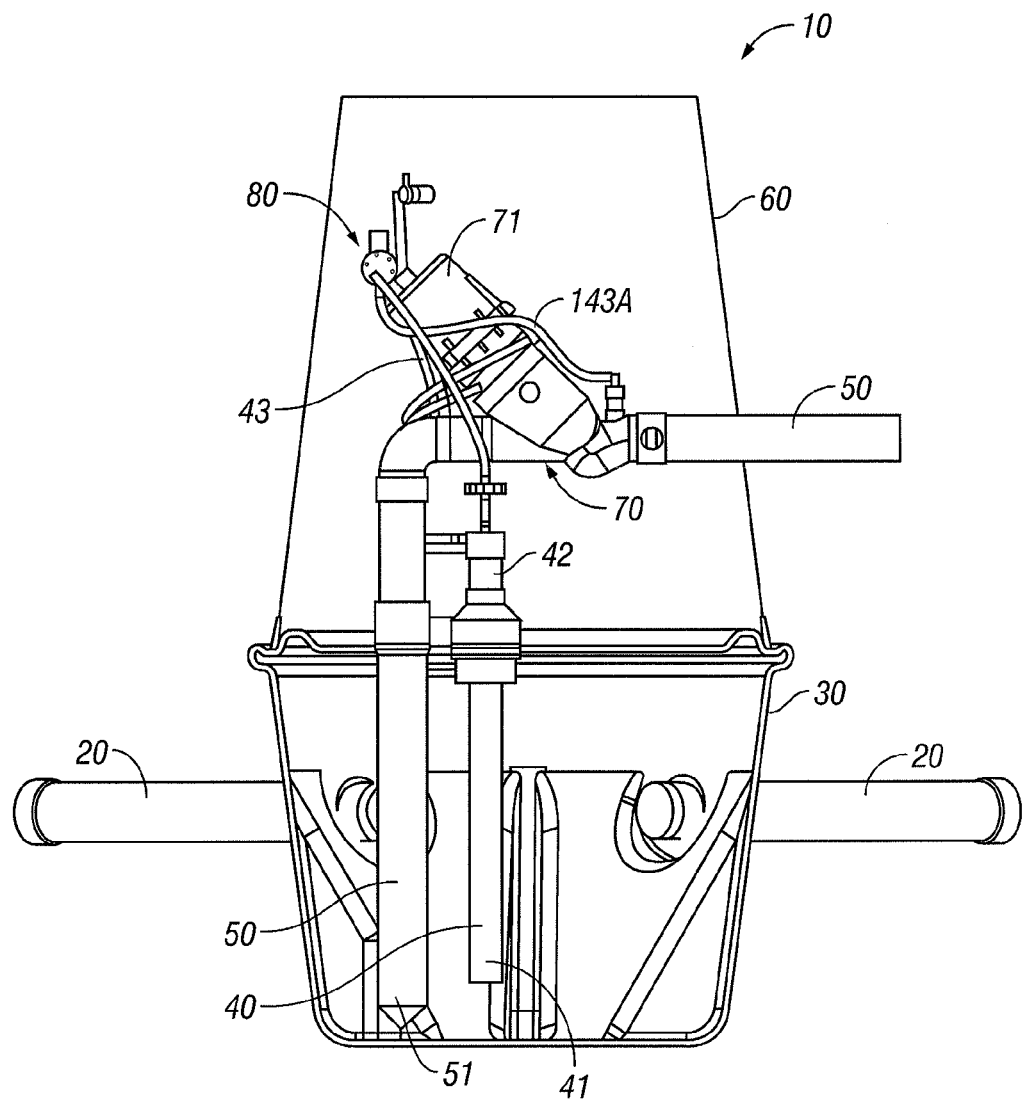
FIG. 1 is a plan view of a section of a vacuum sewage system according to one embodiment of the present invention.

FIG. 1 illustrates a vacuum sewage system 10 including a controller according to one embodiment of the present invention. System 10 includes gravity sewer conduits 20 at atmospheric pressure which drains from a sewage origination point, such as a toilet. Conduits 20 transport sewage to a holding tank 30, which is maintained at atmospheric pressure. A sensor pipe 40 and a discharge conduit 50 extend into tank 30. A first end 41 of pipe 40 extends downwardly into tank 30 to a point spaced above the inlet opening 51 of a discharge conduit 50. The second end 42 of pipe 40 extends into a valve pit 60.

Discharge conduit 50 extends into the valve pit 60 to a valve 70. Numerous types of valves 70 are known in the industry. One example of a valve 70 that can be used with system 10 is disclosed in U.S. Pat. No. 4,171,853. Valve 70 is operated by a controller 80, which will be described in greater detail below. The section of discharge conduit 50 downstream from valve 70 is maintained at vacuum or low pressure by a source of applied vacuum (not shown). Discharge conduit 50 ultimately discharges into a collection station (not shown), which is also maintained at vacuum or low pressure. One type of collection station suitable for use with the present invention is disclosed in U.S. Pat. No. 4,179,371.

In use, sewage is discharged through conduit 20 into tank 30. Under preselected pressure conditions in tank 30 (i.e. when the sewage content of tank 30 is such that a discharge cycle is warranted) valve 70 is opened by controller 80. Opening valve 70 creates a differential pressure between the relatively low pressure or vacuum portion of discharge conduit 50 downstream from valve 70 and the relatively higher or atmospheric pressure portion of discharge conduit 50 upstream from valve 70. This pressure differential causes discharge of the sewage in tank 30 through inlet opening 51 of discharge conduit 50, past valve 70, through the portion of discharge conduit 50 downstream from valve 70 and ultimately to the collection station. Upon completion of the discharge of sewage from tank 30 through the discharge conduit 50, valve 70 is automatically closed and the vacuum sewage transport system of the invention is restored to the stand-by condition.

Figure 2A:
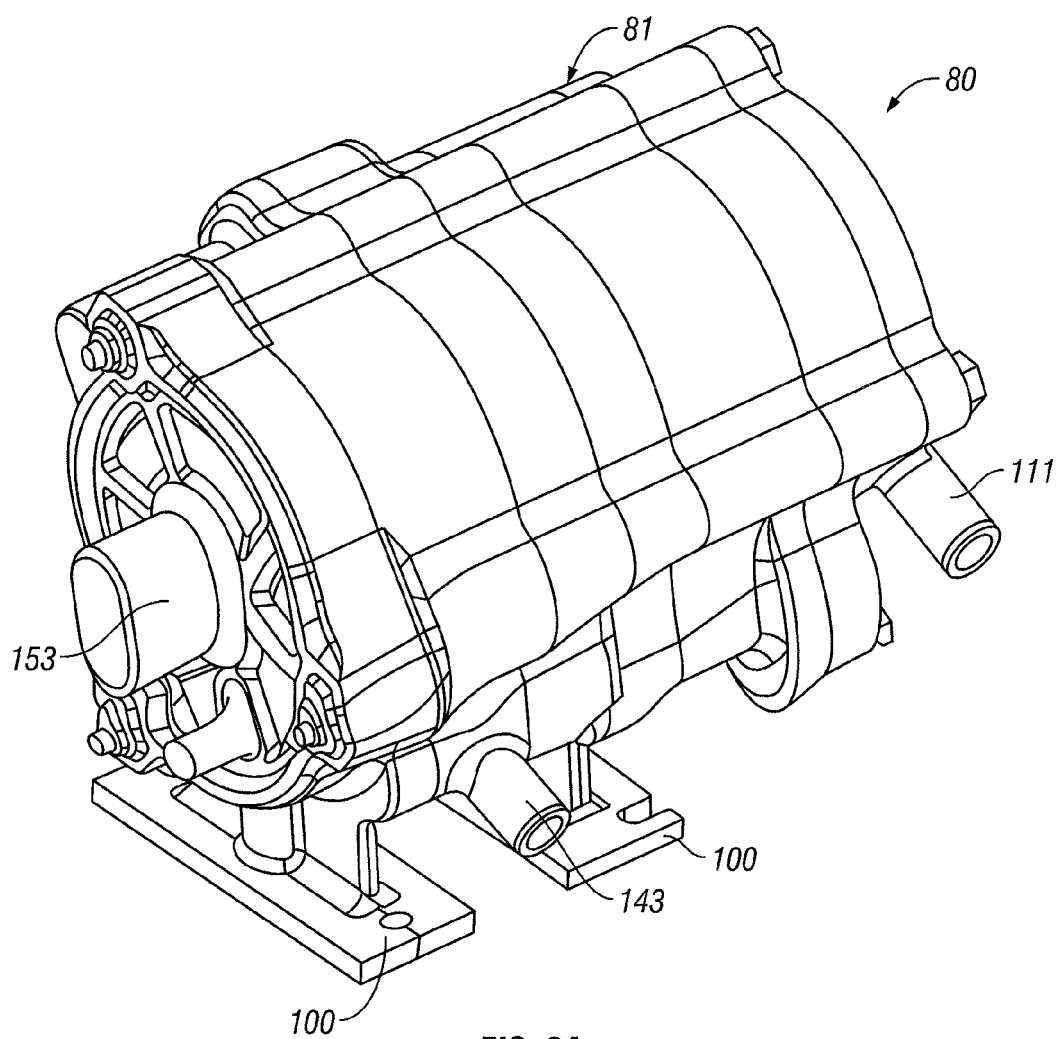
FIG. 2A is a side perspective view of a controller that is a component of the system of FIG. 1.
Figure 2B:
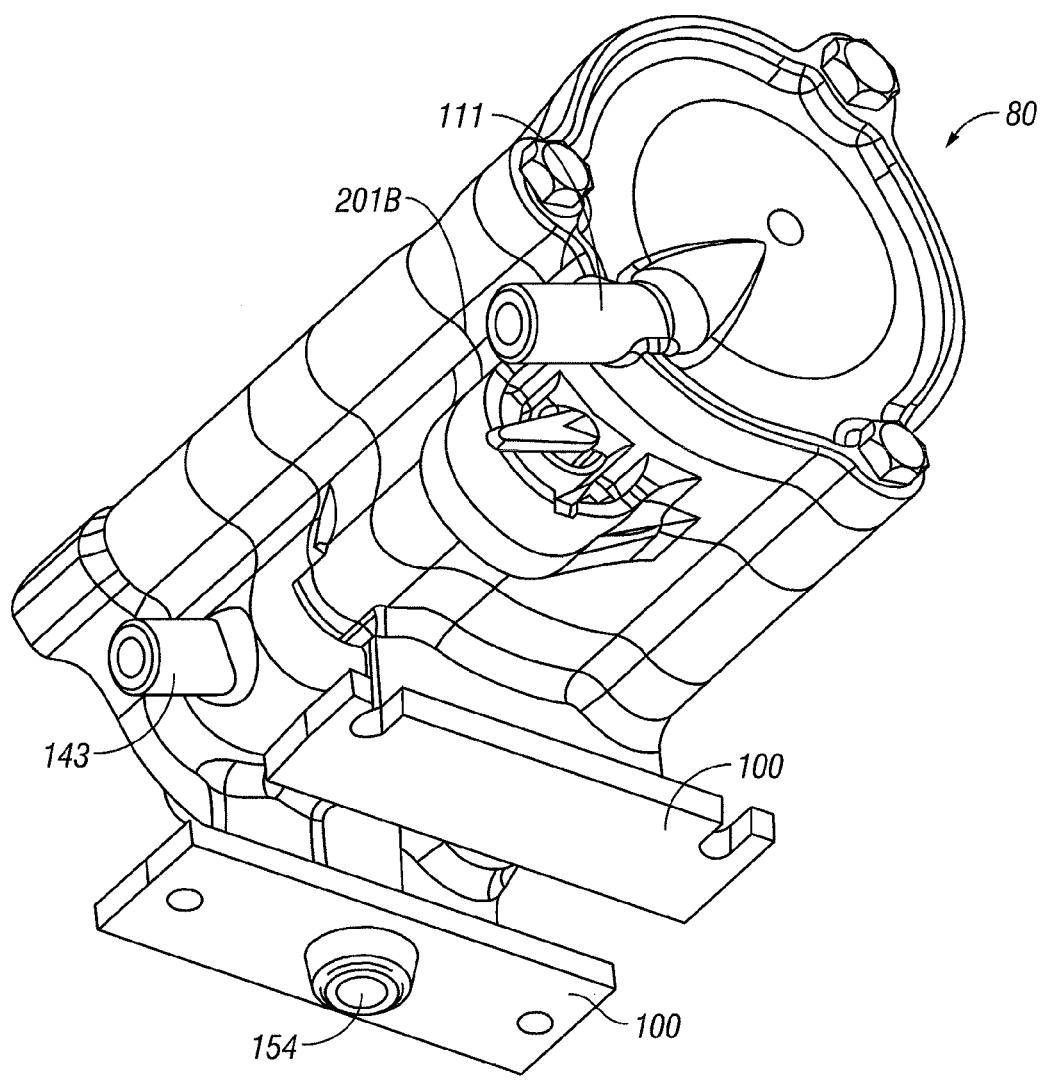
FIG. 2B is a bottom perspective view of the controller of FIG. 2A.
Figure 2C:
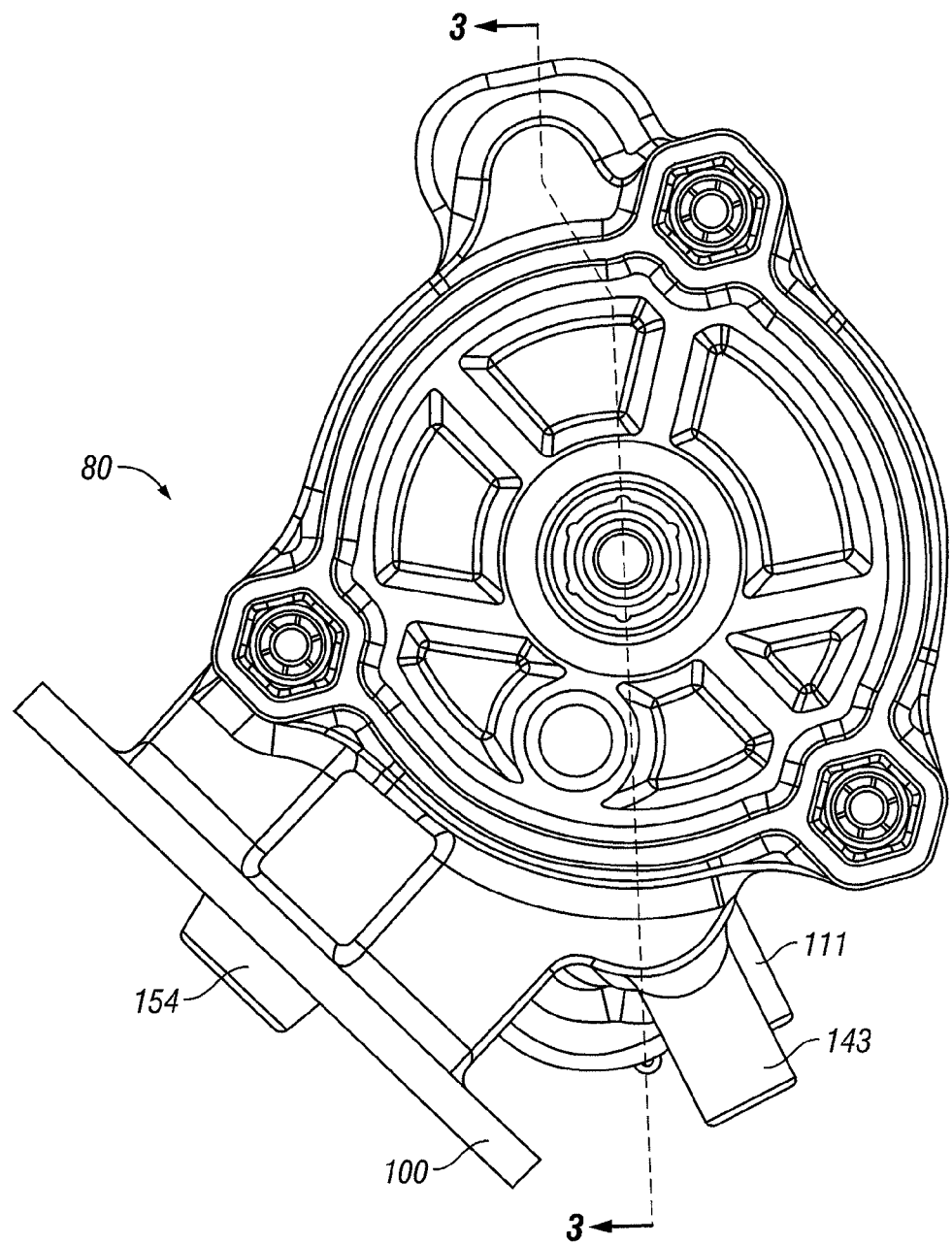
FIG. 2C is an end view of the controller of FIG. 1.

Controller 80 (FIGS. 2A and B) is mounted on valve 70 by one or more brackets 100 or other suitable means. Controller 80 includes a housing 81 formed from an assembly of generally cylindrical and axially aligned sections 110, 120, 120A, 130, 140 and 150. The sections may be secured together by a series of bolts or other fasteners (not shown). Seals S are located between adjacent sections.

Figure 3:
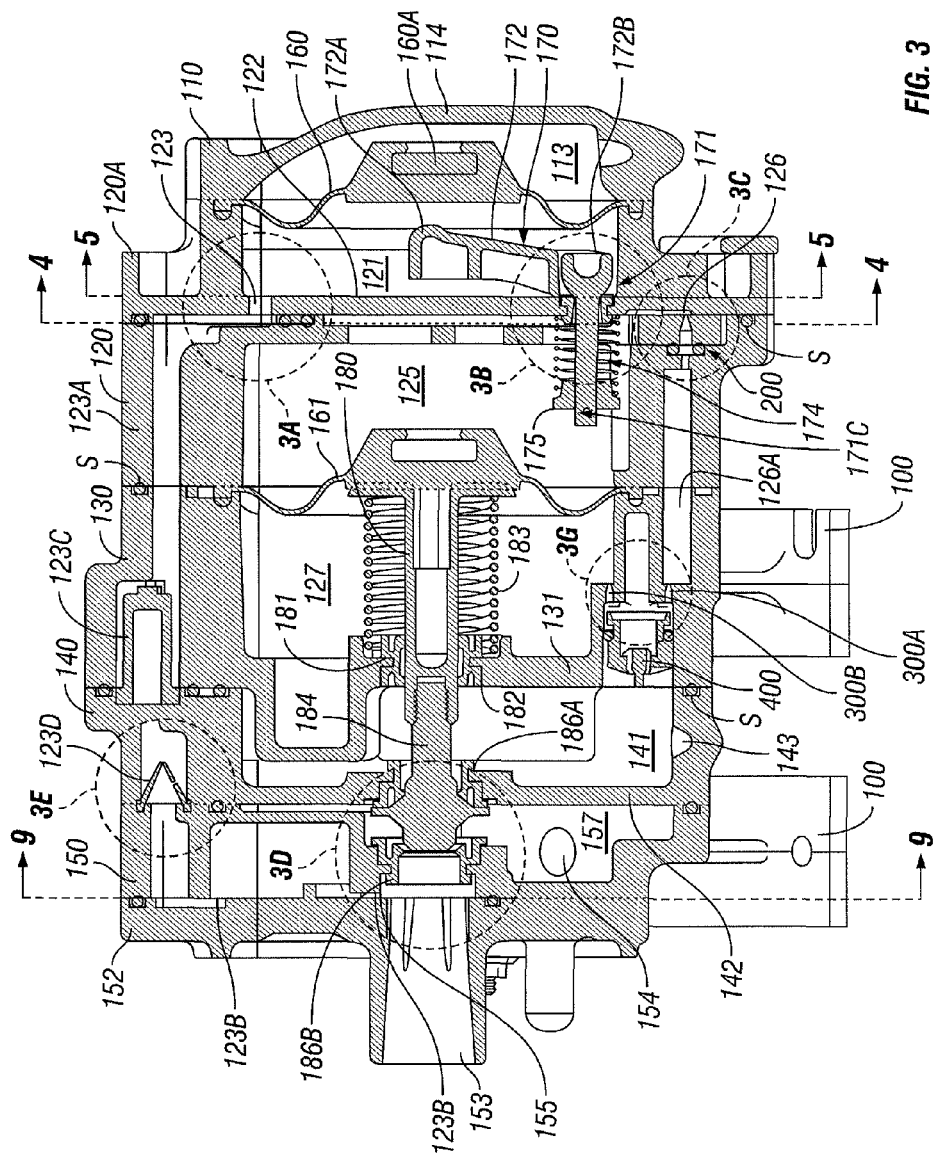
FIG. 3 is a cross sectional view taken along line 3-3 in FIG. 2C showing the controller in the standby state.

A pressure sensor conduit 43 is disposed in pressure communication with pipe 40 at one of its ends and, at its opposite end, is coupled to a pressure sensor port 111 of section 110. Port 111 opens into a first chamber 113 which is defined by a wall 114 of section 110 and a flexible diaphragm 160. A second chamber 121 is located on the opposite side of diaphragm 160 and is formed by diaphragm 160 and a wall 122 of section 120A. Chamber 121 is normally vented to atmosphere through a port 123 (FIGS. 3 and 3A). A port 124 extends through wall 122 providing an air flow path between chambers 121 and 125 (FIG. 3B).

A valve and actuator assembly 170 (FIGS. 3 and 3B) is located in second chamber 121 and is used to selectively allow flow between chambers 121 and 125. Valve and actuator assembly 170 includes a sealing member 171, an actuating lever 172, a seal seat 173, a biasing means 174 and a retainer 175. In the embodiment shown, biasing means 174 is a spring. Sealing member 171 in the embodiment shown includes a head portion of 171A with a shaft 171B extending from a rounded surface 171D. An opening 171C extends through the free end of shaft 171B. Lever 172 includes a first end 172A and a second end 172B. Seal seat 173 is positioned in port 124. Sealing member 171 and lever 172 are located in chamber 121 on one side of wall 122. Shaft 171B extends through seal seat 173. Note that rounded surface 171D of sealing member 171 is self-centering on seal seat 173. Biasing means 174 is positioned on the opposite side of wall 122 and is positioned around shaft 171B. Shaft 171B extends through retainer 175 and is secured in place by inserting pin 175A through opening 171C in shaft 171B.

A third chamber 125 is formed by wall 122 and a diaphragm 161. A port 126 (FIGS. 3 and 3C) extends between sections 120A and 120 of controller 80 and communicates with chamber 125.

A fourth chamber 127 is formed by diaphragm 161 and a wall 131 of section 130. A generally cylindrical rod 180 abuts and extends laterally from diaphragm 161, through an opening 181 in wall 131 and through a seal 182 positioned in opening 181 to prevent fluid or pressure leakage from chamber 127. A biasing means 183 (which is a spring in the embodiment shown) is located between diaphragm 161 and a wall 131 to maintain diaphragm 161 in the stand-by position illustrated in FIG. 3.

A fifth chamber 141 is located on the opposite side of wall 131 from chamber 127 and is formed by wall 131 and a wall 142 of section 140. A vacuum port 143 extends from section 140 and connects to a vacuum line that communicates with the vacuum side of discharge conduit 50 as described in greater detail below. Tapered rod 184 extends from rod 180 opposite diaphragm 161. In the stand-by position illustrated in FIG. 3, all of tapered rod 184 is located in chamber 141 to preclude leakage of vacuum or low pressure therefrom.

A sixth chamber 151 is defined by wall 142 and wall 152 of section 150. An atmospheric pressure port 153 extends from wall 152 and is in communication with chamber 151. A valve connection port 154 also extends from section 150.

A sealing member 185 (FIGS. 3 and 3D) having a first sealing side 185A and a second sealing side 185B is secured to one end of shaft 184. A first valve seat 186A is located in an opening in wall 142 through which shaft 184 extends. A second valve seat 186B is located adjacent the opening to port 153. When the controller is in the stand-by condition of FIGS. 3 and 3D, side 185A of sealing member 185 engages valve seat 186A to prevent vacuum communication from chamber 141 with chamber 151 and valve connection port 154. In this position, chamber 151 and valve connection port 154 are under atmospheric pressure as a result of being in communication with atmospheric pressure port 153.

Figure 3E:
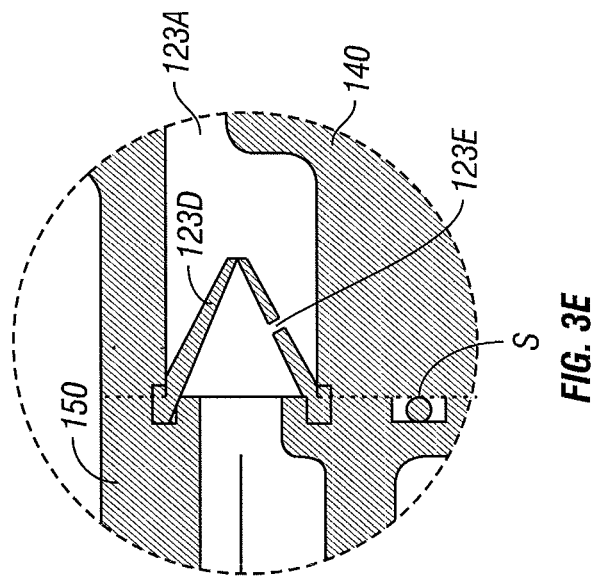
FIG. 3E is an enlarged view of detail 3E in FIG. 3.
Figure 3D:
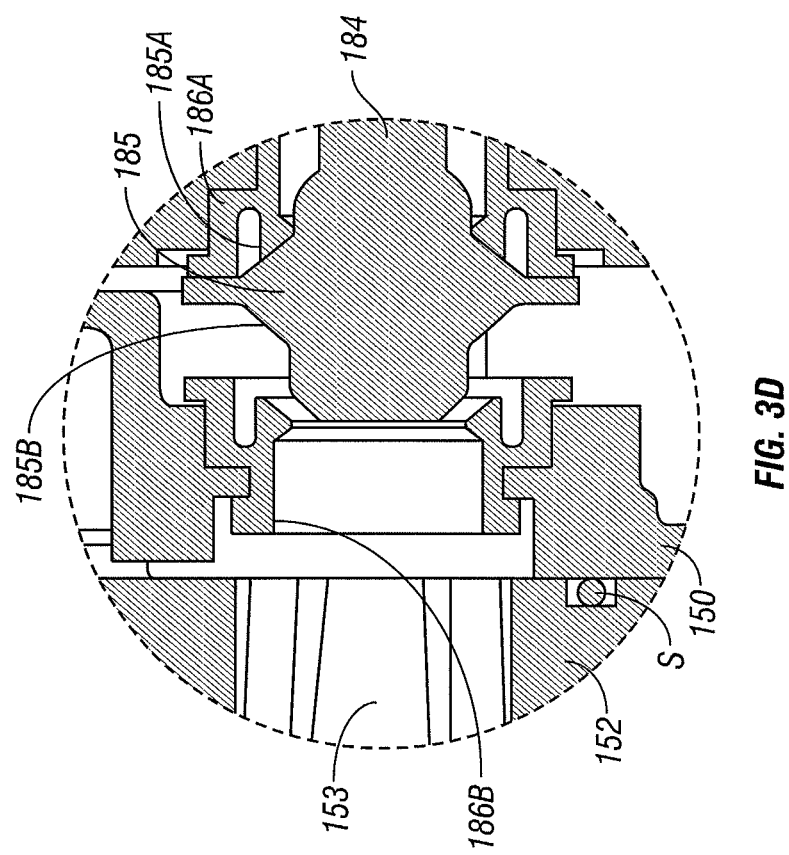
FIG. 3D is an enlarged view of detail 3D in FIG. 3.

Port 123 is in communication with port 153 through a flow path 123A and two ports 123B (FIG. 3). An air filter 123C and a duck bill valve 123D (FIGS. 3 and 3E) are located in flow path 123A between port 123 and port 123B. Note that duck bill valve 123D includes a port 123E through which air at atmospheric pressure can flow even when orifice 123D is closed as shown in FIGS. 3 and 3E.

FIGS. 9A and 9B show an alternative to duck bill valve 123D. In this embodiment of the invention, a check valve 600 includes a body portion 601 extending through an opening 150A in section 150, a head 602 in contact with section 150 on one side of opening 150A and an annular flange 603. One or more grooves or passageways 604 extend through head 602 to opening 150A. Section 150 further includes a groove or passageway 150B extending from at least one passageway 604 beyond the outer perimeter of flange 603. In this manner, flange 603 can seal against section 150 about its entire outer perimeter except in the location of passageway 150B. As a result, air at atmospheric pressure can flow through passageway 604, to passageway 150B and around flange 603 even when flange 603 is seated against section 150 as shown in FIG. 9A.

Figure 5:
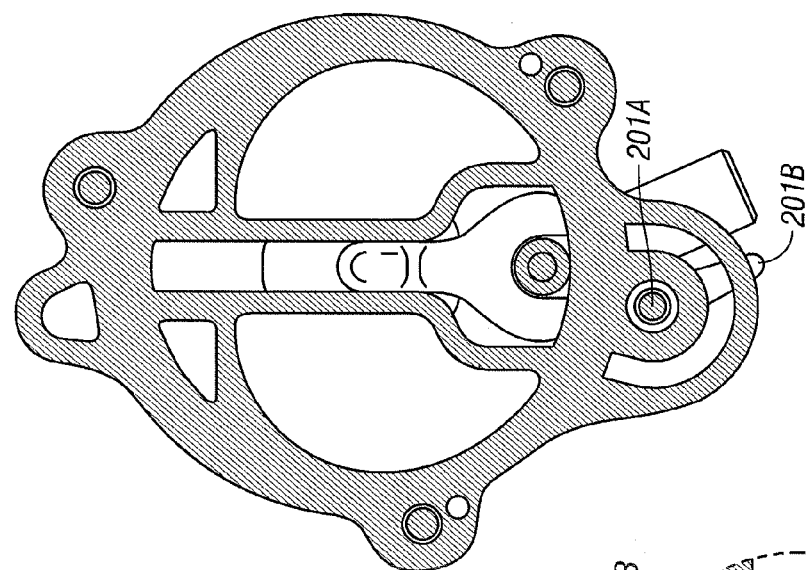
FIG. 5 is a cross sectional view taken along line 5-5 in FIG. 3.
Figure 4:
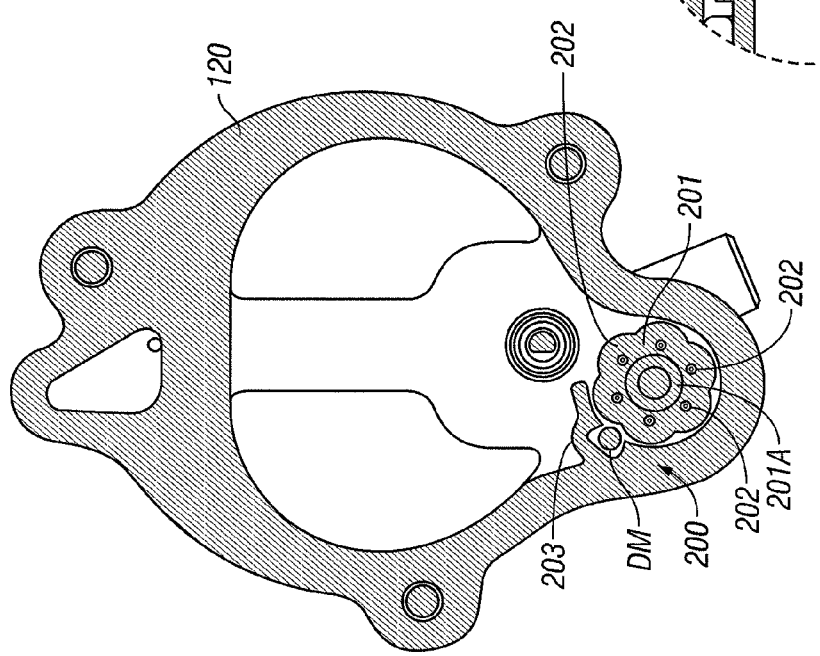
FIG. 4 is a cross sectional view taken along line 4-4 in FIG. 3.

The speed of air flow through and pressure equalization between chambers 121, 125, 127 and 141 is controlled by port 126 and a series of orifices, valves and chambers. Chamber 125 is in communication with chamber 126A through port 126 and adjustable orifice 200 (FIGS. 3 and 4). Adjustable orifice 200 includes notched member 201 having a plurality of orifices 202 of varying sizes extending therethrough. Member 201 is mounted on a rotatable shaft 201A in section 120 adjacent wall 122. A portion 203 of section 120 retains member 201 in controller 80. A lever 201B may be used to rotate member 201 to align the orifice 202 of the desired size such that it is in communication with port 126 as shown in FIGS. 4 and 5. A detent member DM is provided adjacent member 201. In one embodiment, detent member DM is a compressible member, that locates within successive recesses of notched member 201 as it is rotated, thereby indicating alignment of successive orifices 202 with port 126.

FIGS. 8A-8E show an alternative embodiment of an adjustable orifice for use with controllers according to certain embodiments of the present invention. Adjustable orifice 500 includes a notched member 501 having an orifice 502 extending therethrough. Member 501 is mounted on a rotatable shaft 501A in sections 120 and 120A. A first continuous groove 503 extends around shaft 501A on one side of member 501 and is in fluid communication with orifice 502. A second groove 504 extends around shaft 501A on the opposite side of member 501 and is in fluid communication with orifice 502. Groove 504 is of varying width and depth. Adjustable orifice 500 is mounted within controller 80 (FIG. 8E) such that groove 503 is in fluid communication with port 126 regardless of the orientation of member 501. An O-ring OR is positioned between a portion of section 120 and member 501 on the side of adjustable orifice 500 opposite groove 503. As adjustable orifice 500 is rotated, a segment of groove 504 having either greater or lesser volume is exposed inside O-ring OR and in fluid communication with chamber 126A. Air passing through port 126 into groove 503 will flow through orifice 502 and enter groove 504. Air will flow around groove 504 until it reaches the portion of groove 504 exposed within O-ring OR, at which point air will flow through the center of O-ring OR and into chamber 126A. The time it takes for air to flow from port 126 and into chamber 126A may be increased or decreased by exposing a section of groove 504 of greater or lesser volume within O-ring OR.

Figure 6:
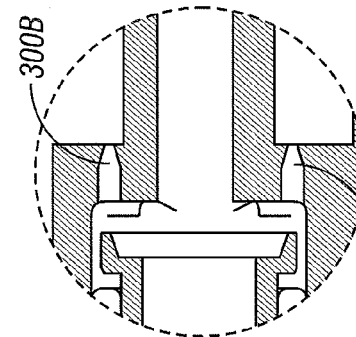
FIG. 6 is an enlarged view of detail 6 in FIG. 3.

Chamber 126A can communicate with chambers 127 and 141 through orifices 300A and B and check valve 400 (FIGS. 3 and 6). Check valve 400 is in the open position when controller 80 is in the stand-by mode. This serves, through vacuum port 143, ports 126 and orifices 200, 300A and 300B, to maintain equalized pressure in chambers 125, 127 and 141 at the low or vacuum pressure of the section of conduit 50 downstream from valve 70 during stand-by. Fluid communication between chambers 125, 127 and 141 is achieved and controlled by this series of ports, orifices and valves, as described in greater detail below.

Vacuum is supplied to controller 80 through a vacuum line 143A connected to vacuum port 143 in a manner known in the art, such as the one disclosed in U.S. Pat. No. 4,171,853. Vacuum line 143A communicates with the section of discharge conduit 50 downstream from valve 70 and thereby supplies a constant low pressure or vacuum source to the controller through the vacuum line and vacuum port 143. In stand-by mode, chamber 151 is maintained at atmospheric pressure through an air breather (not shown) which communicates with port 153 in a manner known in the art. The controller communicates with the valve 70 through valve connector port 154, which is in pressure communication with the upper end 71 of valve 70.

In normal operation, controller 80 will remain in the stand-by condition illustrated in FIG. 3. In this state, head portion 171A of sealing member 171 is seated on seal seat 173 by the force of biasing means 174 and the pressure differential between chambers 121 (which is at atmospheric pressure) and chamber 125 (which is at low or vacuum pressure).

Figure 7:
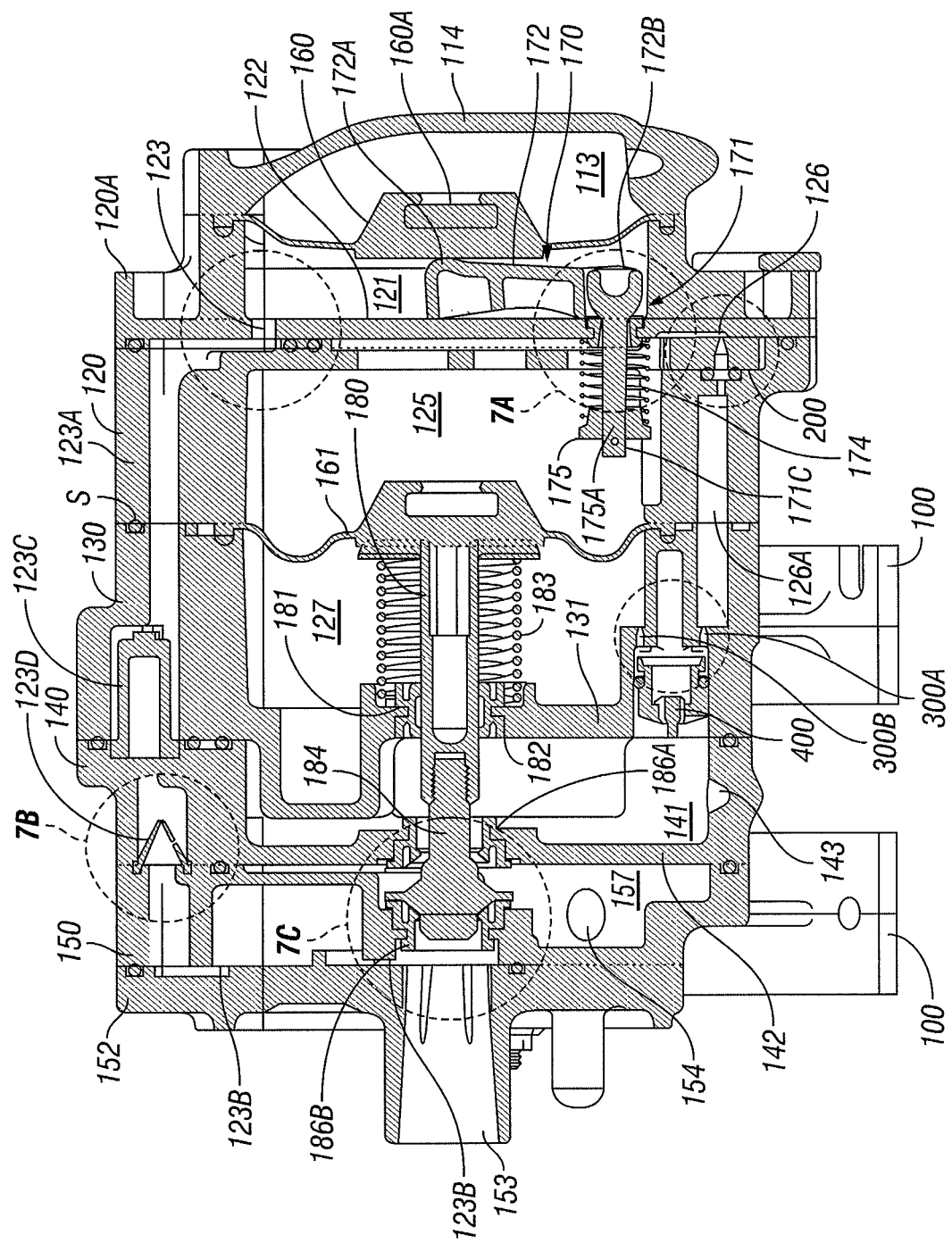
FIG. 7 is a cross sectional view taken along line 3-3 in FIG. 2A showing the controller in the activated state.
Figure 7C:
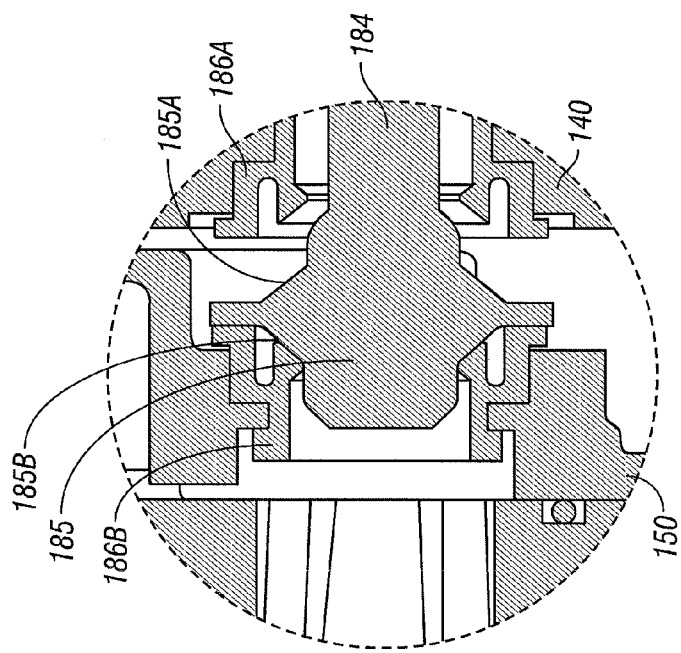
FIG. 7C is an enlarged view of detail 7C in FIG. 7.
Figure 7A:
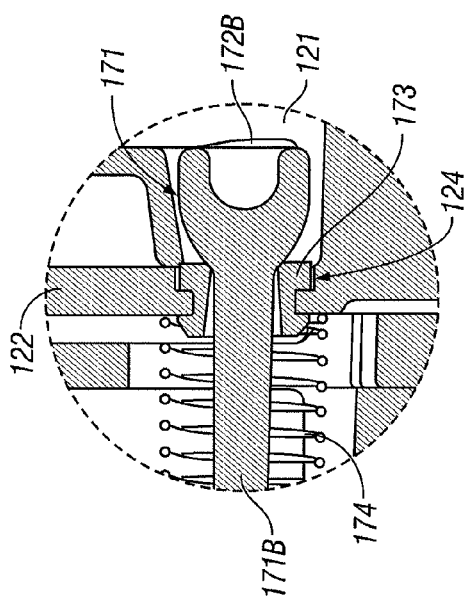
FIG. 7A is an enlarged view of detail 7A in FIG. 7.
Figure 7B:
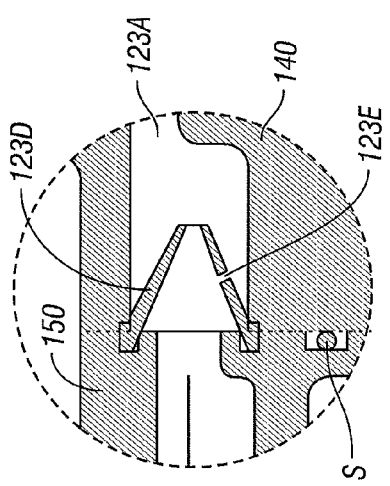
FIG. 7B is an enlarged view of detail 7B in FIG. 7.
Figure 8E:
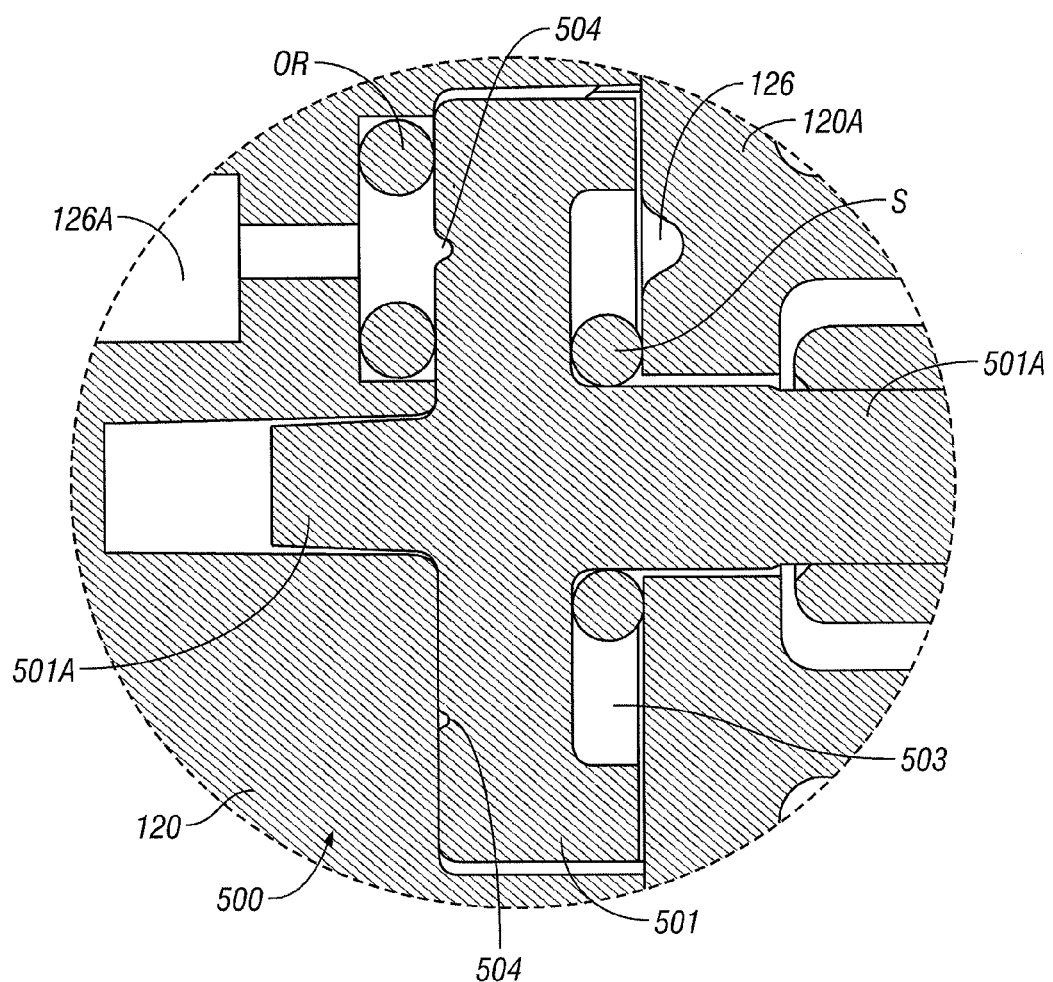
FIG. 8E is an enlarged view similar to that of detail 3C but rotated 90 degrees illustrating the adjustable orifice of FIG. 8A installed in a controller according to one embodiment of the present invention.

Sewage accumulation in tank 30 produces pressure in pipe 40, which is communicated to chamber 113 through pressure sensor port 111 through conduit 43. This pressure increase urges diaphragm 160 toward wall 122 as shown in FIG. 7. As diaphragm 160 moves toward wall 122, it applies pressure to first end 172A of lever 172. This in turn causes first end 172A to move toward wall 122 and second end 172B to pivot away from wall 122. As second end 172B pivots away from wall 122, it draws head portion 171A of sealing member 171 away from sealing seat 173 against the biasing force of biasing means 174, as illustrated in FIG. 7A. This establishes fluid and atmospheric pressure communication between chambers 121 and 125 as atmospheric air flows from port 153, through flow path 123A and through port 123 into chamber 121 and through port 124. Note that the flow of air causes duck bill valve 123D to open as shown in FIG. 7B. Alternatively, if check valve 600 is used, the flow of air through passageways 604 and opening 150A will cause flange 603 to unseat from section 150 to permit increased air flow.

As the low or vacuum pressure in chamber 125 is increased by the introduction of air at atmospheric pressure, diaphragm 161 is urged toward wall 131 by the combination of the increased pressure in chamber 125 and the low or vacuum pressure in chamber 127. This causes rod 180 and tapered rod 184 to move toward wall 152. As this occurs, first sealing side 185A of sealing member 185 disengages valve seat 186A and second sealing side 185B seats against valve seat 186B, thereby closing atmospheric air port 153 against further communication of atmospheric air into chamber 151 and valve connector port 154. As first sealing side 185A moves away from valve seat 186A, fluid and pressure communication between chambers 141 and 151 is established as air flows around sealing member 155 and tapered post 184. This exposes chamber 151 to low or vacuum pressure from vacuum port 143.

As the atmospheric pressure communicating with valve 70 through valve connector port 154 is decreased under the influence of vacuum pressure from chamber 141, valve 70 is activated in a manner known in the art, such as the manner described in U.S. Pat. No. 4,179,371. As valve 70 is opened, the upstream portion of discharge conduit 50 is placed under low or vacuum pressure. Since tank 30 is essentially at atmospheric pressure, the low or vacuum pressure in discharge conduit 50 causes the sewage to be discharged into discharge conduit 50 and transported to the collection station.

The discharge of sewage from tank 30 produces an almost immediate drop of pressure in communication with diaphragm 160 through pipe 40, thereby reducing the pressure in chamber 113. This draws diaphragm 160 away from wall 122 and first end 172A of lever 172. As a result, head portion 171A of sealing member 171 is urged against sealing seat 173 under the influence of biasing means 174, thereby preventing flow from chamber 121 to chamber 125 through port 124. This causes the vacuum in chambers 141 and 151 to drop, resulting in the closure of check valve 400 as the pressure in chambers 125 and 127 begins to equalize. The rate of equalization is controlled by the size of orifices 200, 300A and 300B and by the size of chamber 126A. For example, the smaller the orifices, the slower the equalization of pressure between the various chambers. Similarly, the larger the volume of chamber 126A, the longer the equalization time between the various chambers, as the larger reservoirs have greater volume that needs to be equalized. Use of larger volumes permits use of larger orifices, which in turn allows moisture to pass through controller 80 before the system vacuum is depleted. This also eliminates the need for dip tubes.

As the differential pressures in chambers 125 and 127 equalize, the diaphragm 161 moves toward wall 122 and draws first sealing side 185A back against valve seat 186A. This opens atmospheric air port 153. Atmospheric air pressure again communicates through valve connector port 154 and the resulting pressure change closes valve 70. The movement of sealing member 185 also prevents low or vacuum pressure from being transmitted from chamber 141 to chamber 151. When this occurs, check valve 400 resumes its normally open condition and pressure across chambers 125, 127 and 141 is equalized to that of the vacuum line pressure of conduit 50.

Because of the environment in which controller 80 operates, it is possible for moisture to accumulate in housing 81. In order to help remove moisture from the system, orifices 200, 300A and 300B and chamber 126A are positioned at the bottom of controller 80 so that any moisture collecting at the bottom of controller 80 will tend to be moved out of controller 80 as a result of the air flow caused during cycling. Moisture collecting at the top of controller 80 can flow through ports 123B adjacent wall 152 and around the space between sealing member 185 and valve seat 186B when controller 80 is in the standby mode shown in FIG. 3. This moisture will flow into chamber 151 and through valve connection port 154.

It may also be desirable to test controller 80 to ensure that it is operating properly. For this purpose, diaphragm 160 may be provided with a magnet 160A adjacent wall 114. Controller 80 can be activated by positioning a magnet of opposite polarity to magnet 160A adjacent wall 114. This will repel magnet 160A away from wall 114 so as to contact first end 172A of lever 172, thereby activating controller 80 as described above. FIGS. 10A-10C illustrate an activation tool 700 according to one embodiment of the present invention that can be used to activate controller 80. In the embodiment shown, activation tool 700 generally includes a handle 701, an alignment portion 702 and a magnet 703. Handle 701 can be of any desired length. Alignment portion 702 is secured to handle 701 by molding adhesive or other means. Alignment portion 702 is configured to engage with a portion of housing 81 so as to locate magnet 703 sufficiently close to magnet 160A to activate controller 80. Magnet 703 has a polarity opposite that of magnet 160A. Magnet 703 is secured in alignment portion 702 by molding, adhesive or other means.

Although the present invention has been shown and described in detail the same is to be taken by way of example only and not by way of limitation. Numerous changes can be made to the embodiments described without departing from the scope of the invention. For example, the various orifices could be replaced by smaller diameter tubing sections or other means for restricting flow.

What is claimed is:

1. A controller for a vacuum sewage system, the system including a holding tank at substantially atmospheric pressure, a valve pit, a sensor pipe having a first end extending into the holding tank and a second end extending into the valve pit, a valve located in the valve pit, a discharge conduit for conveying sewage from the holding tank to a location exterior to the holding tank, the discharge conduit having a first section and a second section, the first section having a first end located in the holding tank and a second end in fluid communication with the valve, the second section having an end in fluid communication with the valve and a vacuum source for maintaining the second section of the discharge conduit under vacuum, the controller including:

a housing having an outer surface defining a housing interior;

a first chamber located in the housing;

a pressure sensor conduit having a first end in pressure communication with the sensor pipe and a second end in pressure communication with the first chamber;

a second chamber located in the housing;

a first port in communication with the second chamber and with a source of atmospheric pressure;

a first flexible diaphragm located between the first and second chambers;

a third chamber located in the housing;

a second port extending between the second chamber and the third chamber;

a first valve member located at least partially within the second chamber for selectively opening and closing the second port so as to selectively permit or prevent air flow between the second and third chambers through the second port;

a third port in communication with the third chamber;

a fourth chamber located in the housing;

a second flexible diaphragm located between the third and fourth chambers;

a first air flow path between the third and the fourth chambers, the first air flow path located on one side of the controller completely within interior of the housing;

a fifth chamber located in the housing;

a fourth port in communication with the fifth chamber and with the second section of the discharge conduit;

a second air flow path between the third, fourth and fifth chambers, the second air flow path located on the same side of the controller as the first air flow path and located completely within the interior of the housing;

a second valve member located at least partially in the second air flow path to selectively permit or prevent air flow between the third, fourth and fifth chambers;

a sixth chamber located in the housing;

a fifth port in communication with the fifth chamber and the sixth chamber;

a sixth port in communication with the sixth chamber and with a source of substantially atmospheric pressure;

a third valve member located at least partially in the sixth chamber for selectively opening and closing the fifth port so as to selectively permit or prevent air flow between the fifth and sixth chambers through the fifth port and for selectively opening and closing the sixth port so as to selectively permit or prevent air flow between the sixth chamber and the source of substantially atmospheric pressure through the sixth port;

a seventh port in communication with the sixth chamber;

a third air flow path between the second chamber and the seventh port, the third air flow path located completely within the interior of the housing on a side of the controller opposite the first and second air flow paths; and a fourth valve member located at least partially in in the third air flow path.

2. The controller according to claim 1, wherein the fourth valve member includes an eighth port through which air at atmospheric pressure can flow when the fourth valve member is closed.

3. The controller according to claim 1, wherein the fourth valve member is a duckbill valve.

4. The controller according to claim 1, further including a biasing means for biasing the third valve member toward the fifth port.

5. The controller according to claim 1, further including a valve seat located adjacent the second port and wherein the first valve member disengages from the valve seat to open the second port and engages the valve seat to close the second port, the valve seat and first valve member configured such that the first valve member is centered with respect to the valve seat when the first valve member engages the valve seat.

6. The controller according to claim 1, wherein the housing includes and upper region, a lower region and an eighth port located in the sixth chamber, the third air flow path and the seventh port are positioned in the upper region such that liquid collecting in the upper region of the housing will flow from the third air flow path, through the seventh port, to the lower region of the housing and exit the controller through the eighth port.

7. The controller according to claim 1, further including a magnet connected to the first diaphragm, the magnet having a first polarity.

8. The controller according to claim 7, wherein the controller may be activated by applying to the magnet a magnetic force having a second polarity opposite the first polarity.

9. The controller according to claim 1, wherein movement of the first flexible diaphragm toward the second chamber activates the first valve member to open the second port.

10. The controller according to claim 9, wherein an increase in pressure in the first chamber causes the first flexible diaphragm to move toward the second chamber.

11. The controller according to claim 9, wherein a decrease in pressure in the second chamber causes the first flexible diaphragm to move toward the second chamber.

12. The controller according to claim 1, wherein the fourth valve member is a check valve.

13. The controller according to claim 12, further including an opening through a portion of the housing in the third air flow path and wherein the check valve includes a body extending through the opening, a head attached to the body on one side of the opening and a moveable flange connected to the body on the side of the opening opposite the head.

14. The controller according to claim 13, further including at least one passageway extending through the head.

15. The controller according to claim 14, including a passageway formed in the housing adjacent the moveable flange, the passageway extending from the opening in the housing beyond the outer perimeter of the moveable flange.

16. The controller according to claim 1, further including a rod having a first end extending from the second flexible diaphragm and a second end connected to the third valve member.

17. The controller according to claim 16, wherein the rod extends through the fifth port.

18. The controller according to claim 17, wherein a portion of the rod is tapered.

19. The controller according to claim 16, wherein movement of the second flexible diaphragm imparts movement to the rod and the third valve member to selectively open and close the fifth and sixth ports.

20. The controller according to claim 19, wherein an increase in pressure in the third chamber causes the second end of the rod to move toward the sixth port.

21. The controller according to claim 19, wherein a decrease in pressure in the fourth chamber causes the second end of the rod to move toward the sixth port.

22. The controller according to claim 19, wherein a decrease in pressure in the third chamber causes the second end of the rod to move toward the fifth port.

23. The controller according to claim 19, wherein an increase in pressure in the fourth chamber causes the second end of the rod to move toward the fifth port.

24. The controller according to claim 1, further including an adjustable orifice located at least partially within the first air flow path between the third and fourth chambers.

25. The controller according to claim 24, wherein the adjustable orifice regulates the rate of air flow from the third chamber to the fourth chamber.

26. The controller according to claim 24, wherein the adjustable orifice includes a member having at least two orifices of different sizes.

27. The controller according to claim 26, wherein the member is rotatable.

28. The controller according to claim 27, wherein the member is located on a shaft.

29. The controller according to claim 27, further including a lever located at least partially outside the housing for rotating the member.

30. The controller according to claim 27, further including a detent member for retaining the rotatable member in a selected position.

31. The controller according to claim 30, wherein the detent member includes a compressible member.

32. The controller according to claim 24, wherein the adjustable orifice includes a member having a first side, a second side and a first groove.

33. The controller according to claim 32, wherein the second groove varies in width.

34. The controller according to claim 32, wherein the second groove varies in depth.

35. The controller according to claim 32, wherein the first groove is located in the first side of the member and the member further includes an orifice extending from the first side to the second side.

36. The controller according to claim 35, wherein the orifice creates an air flow path from the first groove through the member to the second side of the member.

37. The controller according to claim 36, further including a second groove in the second side of the member.

38. The controller according to claim 37, wherein the orifice creates an air flow path from the first groove to the second groove.

39. The controller according to claim 38, further including a sealing member having an opening therein adjacent the second groove and wherein movement of the member selectively causes a larger or smaller volume segment of the second groove to be exposed within the opening in the sealing member to increase or decrease the rate of air flow through the adjustable orifice.

40. A controller for a vacuum sewage system, the controller including:
- a housing having a sidewall;
- a first chamber located in the housing and a second chamber located in the housing;
- an air flow path located in the housing sidewall, the air flow path extending between the first and second chambers; and
- an adjustable orifice located at least partially within the air flow path for controlling the rate of air flow between the first and second chamber, the adjustable orifice including a member having a first side, a second side, a first groove located in the first side of the member and a second groove located in the second side of the member, the second groove varying in depth.

41. The controller according to claim 40, wherein the second groove varies in width.

42. The controller according to claim 40, further including a sealing member having an opening therein adjacent the second groove and wherein movement of the member selectively causes a larger or smaller volume segment of the second groove to be exposed within the opening in the sealing member to increase or decrease the rate of air flow through the adjustable orifice.

43. The controller according to claim 40, wherein the member further includes an orifice extending from the first side to the second side.

44. The controller according to claim 43, wherein the orifice creates an air flow path from the first groove through the member to the second side of the member.

45. A controller for a vacuum sewage system, the controller including:
- a housing having a sidewall;
- a first chamber located in the housing and a second chamber located in the housing;
- an air flow path located in the housing sidewall, the air flow path extending between the first and second chambers;
- an adjustable orifice located at least partially within the air flow path for controlling the rate of air flow between the first and second chamber, the adjustable orifice including a member having a first side, a second side, an orifice extending from the first side to the second side and a first groove located in the first side of the member, a second groove in the second side of the member, the orifice creating an air flow path from the first groove through the member to the second groove on the second side of the member; and
- a sealing member having an opening therein adjacent the second groove and wherein movement of the member selectively causes a larger or smaller volume segment of the second groove to be exposed within the opening in the sealing member to increase or decrease the rate of air flow through the adjustable orifice.

* * * * *